United States Patent Office 2,904,574
Patented Sept. 15, 1959

2,904,574

PREPARATION OF ORGANO-HALO-SILANES

Samuel Kohn and Hubert Bourdot, Paris, France, assignors to Office National d'Etudes et de Recherches Aeronautiques, Chatillon-sous-Bagneaux, France, a corporation of France No Drawing. Application July 9, 1956
Serial No. 596,446

Claims priority, application France July 13, 1955

8 Claims. (Cl. 260—448.2)

This invention relates to the preparation of organo-halo-silanes, and provides a method of preparing such compounds by direct synthesis, that is by reacting compounds of the form RX with silicon, where R designates any hydrocarbon radical and X a halogen.

It has already been proposed to perform such synthesis by a catalytic direct reaction of a halogenated hydrocarbon with silicon. For this purpose, so-called "contact masses" are prepared which generally comprise mainly copper or silver, and the synthesis is carried out in the vapour phase. The contact masses are prepared by sintering a mixture of silicon and copper powder reduced at about 1000° C. in the presence of hydrogen. The preparation of such contact masses involves considerable difficulties. It is a long, complicated and expensive affair. Besides, the resulting catalytic masses have comparatively low reactivity. Moreover, on exhaustion of the silicon content the contact masses cannot be reused. This is ascribed to the fact that the metallic copper contained in the masses promotes cracking of the hydrocarbon compound at the reaction temperatures, releasing carbon. This carbon coats the contact mass and imprisons it so as to inactivitate it completely. Thus, not only is silicon consumed but so are the other constituents of the contact mass.

The invention contemplates a method of preparing a catalytic mass adapted for use in the production of organo-halo-silane derivatives by synthesis, wherein a reagent mass containing a catalyst is prepared either by precipitation of copper sulfide on silicon or by silicon-reduction of cuprous chloride mixed with the silicon, the reduction being carried out in a partial vacuum. Apparently, in either case, the high activity of the resulting catalytic mass is due primarly to the fact that it contains a copper silicide in the so-called kappa phase.

The invention is likewise directed to a practical mode of execution of such process, characterized in that it is carried out at a relatively low temperature so as to promote the formation of small-size crystals, thereby increasing the over-all active area of the catalyst and hence the catalyst's activity.

The method of preparing organo-halo-silane derivatives according to the invention comprises passing the organic compound RX over a catalytic mass obtained as indicated above. The synthesis is then able to set in at a lower temperature than what was possible with previously known catalytic masses. Moreover owing to the absence of metal copper in the catalytic mass, no cracking is found to occur as the exothermal reaction proceeds and raises the temperature of the mass. Hence the temperature may be allowed to rise to higher levels than in conventional masses, with the attendant advantages.

The reagent mass of the invention, which actually contains a catalyst, retains its activity in full during the synthesis process. On exhaustion of the silicon in the mass, the latter can readily be enriched as to its silicon content again and again and the reaction may be resumed. In theory therefore only silicon is consumed while the same catalyst may serve to produce extremely large amounts of organo-halo-silanes.

The above advantages are achieved even though the copper content in the catalytic mass, in the form of copper salts, is considerably less (easily three or four times less) than in conventional catalytic masses which contain copper in the form of metallic powder metal.

Preparation of a reagent mass

I. FIRST METHOD

A reagent mass comprising silicon coated with copper sulfide is prepared. Best results have been obtained when this mass was prepared by precipitating copper sulfate with sodium sulfide in a highly alkaline medium, in the presence of silicon. The reaction proceeds according to the equation:

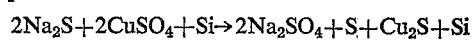

$$2Na_2S + 2CuSO_4 + Si \rightarrow 2Na_2SO_4 + S + Cu_2S + Si$$

EXAMPLE A 700 grams of silicon are suspended through violent mechanical agitation in 4,200 cc. of a 6.4% aqueous solution of sodium sulfide (i.e. 1.12 mol. $Na_2S$, $9H_2O$); 2,240 cc. of a 6.25% aqueous solution of copper sulfate (i.e. 0.56 mol. $CuSO_4$, $5H_2O$) are admixed. As a result the reaction will proceed in the presence of a high excess of sodium sulfide, so that the medium is highly alkaline (pH=9). The resulting precipitate is drained dry and washed until neutral (pH=7), then dried in a current of nitrogen at 280 to 300° C. Preferably the mass should not be heated above about 320 to 330° C.

The resulting mass may be rendered more porous by incorporating into it its own weight again of 4 mm. Pyrex Raschig rings. The drying may alternatively be carried out in an oven at 200° C., in an oxygen-free nitrogen current during 2½ hours. The mass may be used in the form it is obtained or it may be agglomerated before use.

II. SECOND METHOD

The reagent mass is obtained by reducing a cuprous halide. It has already been suggested to prepare a catalytic mass from cuprous chloride by heating a mixture of silicon powder (greatly in excess) and cuprous chloride at a sufficiently high temperature. The threshold of the reaction is about 280° C. The cuprous chloride is reduced by the silicon in accordance with the equation:

$$4CuCl + nSi \rightarrow SiCl_4 + 4Cu + (n-1)Si$$

In accordance with the invention the above reaction is carried out in a partial vacuum, in an atmosphere of nitrogen at a pressure e.g. of about 12 mm. mercury. A catalytic mass is obtained which has much greater activity than anything obtained heretofore. Alternatively one may start from cuprous bromide $CuBr_2$. The resulting catalyst has comparable activity.

EXAMPLE B

A mixture of cuprous chloride and silicon powder (98% pure silicon) passed through a sieve designated AFNOR No. 21 (i.e. to provide particles in a range of from 2.5 to 45 microns in diameter) is dried in an oven in a nitrogen current at a temperature less than 280° C. The dry material is reduced in an atmosphere of pure (oxygen-free) nitrogen at a pressure of 12 mm. mercury, and a temperature in the range of 280 to 300° C. Reduction is complete after about 4 hours as manifested by the fact that no more silicon tetrachloride is distilled out.

In the example, the proportions of cuprous chloride and silicon are such that the contact mass obtained contains 30% copper (46.6 g. cuprous chloride for 100 g. silicon).

Preparation of the halo organo silanes

EXAMPLE 1

To produce allyl-chlor-silanes, there is passed over a mass as prepared in Example A, containing Raschig rings (200 g. of reagent mass and 200 g. Raschig rings) a current of nitrogen as in the said example but saturated with allyl chloride by bubbling the nitrogen through allyl chloride at 20° C. The temperature selected for the reaction is 210°–220° C. No cracking is found that would contaminate the catalyst. The resulting outflow is rectified in a Vigreux column including five theoretical trays, first at ordinary pressure then in vacuo. After 97 hours of operation 532 grams of product are obtained, analyzing as follows:

| | Percent |
|---|---|
| Unconverted allyl chloride | 12 |
| Allyl-dichlorsilane $C_3H_5SiHCl_2$ | 5 |
| Allyl-trichlorsilane $C_3H_5SiCl_3$ | 14 |
| Diallyl-dichlorsilane $(C_3H_5)_2SiCl_2$ | 24 |
| Undistillable residuum | 31 |
| Losses | 14 |

EXAMPLE 2

The mass of silicon coated with copper sulfide as obtained in Example A (400 grams of reagent mass without any Raschig rings) is dried in an oven at 220° C. for two hours in a current of oxygen-free nitrogen.

To cause the allyl-chlorsilane-forming reaction to occur, the same current of nitrogen, except for its being saturated with allyl chloride by bubbling at 18° C., is again used.

In a first stage the reaction temperature is maintained at 150 to 210° C. After 211 hours of operation 352 grams of product are obtained in the following proportions:

| | Percent |
|---|---|
| Unconverted allyl chloride | 26 |
| Allyl-dichlorsilane | 1 |
| Allyl-trichlorsilane | 16 |
| Diallyl-dichlorsilane | 13 |
| Undistillable fraction | 1 |
| Residual substances and losses | 44 |

The operation is then continued at a reaction temperature of 185 to 215° C. After 86 hours, 165 grams of product are obtained as follows:

| | Percent |
|---|---|
| Allyl chloride | 24 |
| Allyl-dichlorsilane | 2 |
| Allyl-trichlorsilane | 13 |
| Diallyl-dichlorsilane | 11 |
| Undistillable residuum | 4 |
| Residual unanalyzed substances and losses | 46 |

EXAMPLE 3

The reagent mass was prepared as in Example A above. However the porosity of the mass was not increased by the addition of Raschig rings. Over 400 grams of the reagent mass a current of methyl chloride was passed, the temperature was 300 to 350° C. No cracking was found to occur.

After 107 hours of operation 468 grams were obtained of product analyzed as follows:

| | Percent |
|---|---|
| Volatiles, including sulfides etc | 9 |
| Trimethyl-chlorsilane | 11 |
| Dimethyl-dichlorsilane | 38 |
| Methyl-trichlorsilane | 38 |
| Residuum and losses | 4 |

EXAMPLE 4

400 grams of a reagent mass obtained as in Example B above are placed in a Pyrex glass tube within an electric furnace having means for controlling the furnace temperature to within ±2° C. Over this mass methyl chloride was passed of the technical grade, purified by bubbling it through concentrated sulfuric acid. The temperature was 300 to 350° C. at the various stages of the reaction. Nearly the whole reaction occurred at about 300° C. The time required for converting 70% of the silicon was 91 hours.

The reaction products were collected in containers protected against the action of the atmospheric medium and suitably cooled. After 91 hours, 722 grams were obtained of products analyzed as follows:

| | Percent |
|---|---|
| Trimethyl-chlorsilane | 12 |
| Dimethyl-dichlorsilane | 55 |
| Methyl-trichlorsilane | 18 |
| Residuum and losses | 15 |

The exhausted contact mass was enriched with silicon so as to restore it to the original pure silicon content of 70%. The regenerated mass was then put back into a Pyrex tube and technical grade methyl chloride passed over it. Methyl-chlorsilanes were again obtained with high yield. The following table gives the results of the various successive runs obtained with the same catalyst enriched in silicon to the same original content after each run:

| Run No. | Reaction time, hrs. | $CH_3Cl$ used by weight, grams | Weight of reaction product, grams | Reaction temperature, degrees |
|---|---|---|---|---|
| 1 | 91 | 2,207 | 722 | 300–350 |
| 2 | 97 | 980 | 493 | 300–360 |
| 3 | 32 | 283 | 316 | 330 |

It will be noted that the activity of the catalyst increases with each successive addition of silicon thereto. The yield in liquid products in terms of methyl chloride used increases and the reaction temperature decreases.

The mass is not exhausted after the third operation and might be used anew.

EXAMPLE 5

The same contact mass as in the foregoing example is used, and methyl chloride is again passed but the reaction temperature is selected within the range of from 290 to 400° C., almost the whole reaction proceeding between 350 and 370° C. After 28 hours, 750 grams are obtained of products analyzed as follows:

| | Percent |
|---|---|
| Trimethyl-chlorsilane | 5.5 |
| Dimethyl-dichlorsilane | 42.0 |
| Methyl-trichlorsilane | 39.0 |
| Residuum and losses | 13.5 |

EXAMPLE 6

The same contact mass is used as in the two preceding examples, but methyl bromide is passed thereover. The reaction is performed at 250 to 350° C., with almost the whole reaction proceeding at 290 to 330° C. After 90 hours, 850 grams of products analyzing as follows are obtained:

| | Percent |
|---|---|
| Trimethyl-bromsilane | 7 |
| Dimethyl-dibromsilane | 45 |
| Methyl-tribromsilane | 37 |
| Residuum and losses | 11 |

What we claim is:

1. A method of preparing a catalytic mass for the manufacture of organo-halosilane derivatives, comprising the step of precipitating copper sulfide upon silicon.

2. A method of preparing a reaction mass for the manufacture of organo-halosilanes, comprising reacting copper sulfate and sodium sulfide in the presence of silicon in a highly alkaline medium.

3. A method of preparing halo-organosilane derivatives, comprising first preparing a reaction mass by precipitation of copper sulfide on silicon, then passing over said mass a compound of the form RX, wherein R is an aliphatic hydrocarbon radical and X a halogen.

4. A method of preparing halo-organosilanes, comprising first reacting in a highly alkaline medium copper sulfate and sodium sulfide in the presence of silicon, then passing over the resulting reaction mass a current of allyl chloride-saturated nitrogen at a temperature within the range of from 210 to 220° C.

5. A method of preparing according to claim 4, wherein the current passed over the reaction mass is obtained by bubbling nitrogen through allyl chloride at a temperature within the range of 15 to 25° C.

6. A method of preparing allyl-chlorsilanes, comprising first preparing a reaction mass by precipitating copper sulfide upon silicon, then passing over said mass a current of nitrogen saturated with allyl chloride by bubbling the nitrogen through allyl chloride between 15° and 25° C., and first maintaining the reaction temperature at 150°–200° C., and thereafter at 185°–215° C.

7. A method of preparing methyl-chlorsilanes comprising first preparing a reaction mass by precipitating copper sulfide on silicon and then passing over said mass a current of methyl chloride at a temperature in the range of from 300° to 500° C.

8. A method of preparing halo-organosilanes as claimed in claim 3, wherein the reaction mass after exhaustion of the silicon therein is reenriched in silicon and thereafter is again reacted with the RX compound.

References Cited in the file of this patent

UNITED STATES PATENTS

| | | |
|---|---|---|
| 2,380,999 | Sprung et al. | Aug. 7, 1945 |
| 2,420,912 | Hurd | May 20, 1947 |
| 2,447,873 | Rochow | Aug. 24, 1948 |
| 2,532,430 | Strother et al. | Dec. 5, 1950 |
| 2,651,651 | Simons et al. | Sept. 8, 1953 |
| 2,657,114 | Wagner | Oct. 27, 1953 |

FOREIGN PATENTS

| | | |
|---|---|---|
| 275,795 | Switzerland | Sept. 1, 1951 |
| 920,187 | Germany | Nov. 15, 1954 |
| 1,132,611 | France | Nov. 5, 1956 |

OTHER REFERENCES

Thomsen: "Berichte der Deutschen Chemischen Gesellschaft," vol. 11 (1878), pp. 2043–4.

Rochow: "An Introduction to the Chemistry of the Silicones," 2nd ed. (1951, John Wiley & Sons, Inc., New York, publishers, pp. 40–41.